United States Patent [19]

Sirat et al.

[11] Patent Number: 5,533,140
[45] Date of Patent: Jul. 2, 1996

[54] SYSTEM FOR TRANSMITTING AND/OR STORING SIGNALS CORRESPONDING TO TEXTURED PICTURES

[75] Inventors: Jacques A. Sirat, Limeil Brevannes; Christophe Oddou, Ablon S/S, both of France

[73] Assignee: U.S. Philips Corporation, New York, N.Y.

[21] Appl. No.: 345,877

[22] Filed: Nov. 28, 1994

Related U.S. Application Data

[63] Continuation of Ser. No. 991,037, Dec. 15, 1992, abandoned.

[30] Foreign Application Priority Data

Dec. 18, 1991 [FR] France .................................. 91 15724
Dec. 23, 1991 [FR] France .................................. 91 16034

[51] Int. Cl.⁶ ................................................. G06K 9/52
[52] U.S. Cl. ........................... 382/108; 382/206; 348/420
[58] Field of Search ............................... 382/21, 22, 28, 382/54, 56, 108, 197, 199, 206, 286; 348/420, 409

[56] References Cited

U.S. PATENT DOCUMENTS

| | | | |
|---|---|---|---|
| 4,394,774 | 7/1983 | Widergren et al. | |
| 4,679,079 | 7/1987 | Catros et al. | 358/136 |
| 4,868,764 | 9/1989 | Richards | 382/56 |
| 5,025,478 | 6/1991 | Morris et al. | 382/22 |
| 5,144,426 | 9/1992 | Tanaka et al. | 358/133 |
| 5,144,688 | 9/1992 | Bovir et al. | 382/21 |
| 5,204,920 | 4/1993 | Moran et al. | 382/54 |

FOREIGN PATENT DOCUMENTS 0454234  10/1991  European Pat. Off. .

OTHER PUBLICATIONS

Li et al., "Classified Vector Quantization of Images Using Texture Analysis", 1990, pp. 1007–1010.
Barba et al., "Optimization of a Monochrome Picture Coding Scheme Based on a Two–Component Model", 1988, pp. 618–622.
Nasrabadi et al., "Image Coding Using Vector Quantization: A Review", IEEE Transactions on Communication, vol. 36, No. 8, Aug. 1988, pp. 957–971.
Giusto et al., "High–Performance Image Coding: Integration of Different Techniques by a Knowledge–Based Recognition System", Alta Freqenza, vol. 58, No. 3, May 1989, pp. 277–285.
R. Leonardi, Thesis, "Segmentation Adaptive Pour Le Codage D'Images", No. 691, (1987), Ecole Polytechnique Federale De Lausanne.
X. Michel et al., "Unsupervised Segmentation of Texture Images", SPIE vol. 1001, Visual Communications and Image Processing '88, pp. 582–590.

*Primary Examiner*—Stephen Chin
*Assistant Examiner*—Timothy J. May
*Attorney, Agent, or Firm*—Leroy Eason

[57] ABSTRACT

Device for transmitting and/or storing signals presented thereto representing the textures of different areas of a video picture. The device includes a sampling stage for deriving a reference sample of the texture signals from a given picture area, and a coding stage for coding the reference sample signal as well as area signals representative of texture over the entire area from which the sample has been taken. The coded output signals of the coding stage may be transmitted by a transmission medium such as a communication channel and/or a store. A decoding stage then decodes the coded signals, and a texture synthesis stage uses the decoded sample signals to enhance the decoded area signals, thereby effectively achieving synthesis of a reproduction of the relevant picture area having a texture closely resembling the texture of such area of the original picture.

9 Claims, 4 Drawing Sheets

SYSTEM FOR TRANSMITTING AND/OR STORING SIGNALS CORRESPONDING TO TEXTURED PICTURES

This is a continuation of application Ser. No. 07/991,037, filed Dec. 15, 1992 now abandoned.

BACKGROUND OF THE INVENTION

1. Field of Invention

The invention relates to a device for transmitting and/or storing texture signals available in the form of digital signals corresponding to the luminosity of the pixels of a picture, and to a device for synthesizing texture signals for such a transmitting and/or storage device. The invention also relates to a system transmitting and/or storing texture signals corresponding to at least partly textured pictures. Herein, texture to be understood to mean a picture area of homogeneous appearance, even if it is not strictly uniform. Such an invention is suitable for all uses where video information compression is employed, particularly in products such as CD-I, Minitel, videophones or digital video recorders, as well as high-definition television or medical imaging.

2. Description of the Related Art

For transmission and/or storage of image data it is often necessary to reduce the amount of such data. Currently used data compression methods treat the picture as a collection of two-dimensional data signals without any further assumptions being made as to the nature of these signals. For example, in accordance with one method the picture is subdivided into regular blocks each having therein a given number of picture elements (or pixels), and the data signals corresponding to these blocks are subjected to an orthogonal transform and subsequently to a variable-length coding. U.S. Pat. No. 4,394,774 describes a digital data compression system which uses such a method and which thus enables signals corresponding the original signals to be subsequently reconstituted from the compressed signals by minimizing an average error criterion per block. However, such an approach, which is satisfactory at high bit rates (approximately 1 bit per pixel), is not suitable at lower bit rates because latent artifacts appear such as block effects or blurring due to removal of the high frequencies.

Therefore, it is an object of the invention to provide a device which, on the contrary, allows for the pixel data signals to be transmitted and/or stored in a manner which enables a specific coding method to be used which is very economical both as regards the amount of transmitted data and the computing time, and which allows the original data signals to be recovered as reliably as with prior techniques.

SUMMARY OF THE INVENTION

To this end a transmitting and/or device in accordance with the invention is characterized in that it comprises:

(A) a sampling stage for deriving a reference sample of the texture signals of a given picture area;

(B) a coding stage comprising circuits for coding the reference sample signals and also coding so-called area signals representative of the texture signals corresponding to the entire area from which the reference sample has been taken, the coded output signals of said coding stage being supplied to a transmission medium which may be a communication channel and/or storage means;

(C) arranged at the output of said transmission medium, a decoding stage for decoding said coded signals; and (D) arranged at the output of said decoding stage, a stage for combining the decoded signals to reconstruct a synthetic picture having the original texture present in the picture at the input of the device in the relevant picture area.

The structure of the proposed device utilizes the fact that since the signals to be encoded are texture signals having in effect a certain repetition, a representative sample of these signals can be derived and only said sample of the relevant texture need be encoded, a complete synthesis of the original picture not being performed until after decoding of the encoded sample signals.

In a particular embodiment the invention is characterized in that (a) the sampling stage is a sampling circuit for taking a reference sample representative of the texture which is to be transmitted and/or stored;

(b) the coding stage comprises a coding circuit for coding the output signals of said sampling circuit, which output signals correspond to the reference sample thus taken, and a further coding circuit for the area signals corresponding to said entire area;

(c) the decoding stage comprises, arranged in parallel at the output of said transmission and/or storage means, respective decoding circuits for the coded reference sample signals and the coded area signals;

(d) the picture synthesizing stage comprises a circuit for forming a dictionary of equal-size blocks of the pixels represented by the reference sample signals, and a circuit for extrapolation of the area signals in accordance with the pixel data from said dictionary-forming circuit.

Such structure provides on the one hand an approximative synthetic picture which is an approximative reconstruction of the characteristics of the texture of the area considered, and on the other hand information which takes into account the special nature of the original signals (areas of homogeneous texture) and is used to improve the comparatively rudimentary reproduction of area texture by means of extrapolation, the rough picture being completed by restoration of the texture patterns with substantially the same accuracy as in the reference sample and at the same positions as in the original picture. If the original picture comprises areas of different textures, each of these areas is treated in a similar way to restore each of the textures in the synthetic picture.

It is a further object of the invention to provide a device for synthesizing texture signals which have been encoded and previously transmitted and/or stored as digital signals, in such a manner that it is possible reconstitute a faithful synthetic picture based on an approximation of the texture of the original picture and a sample representative of the complete texture patterns thereof, thus completing the approximative synthetic picture by a kind of final extrapolation.

For this purpose the invention provides a device for synthesizing signals representative of a texture pattern, characterized in that it comprises a circuit for forming a dictionary of at least a series of equal-size blocks of the pixels represented by the reference sample signals,. and a circuit for extrapolation of the approximative synthetic image with the aid of the pixel data from the dictionary-forming circuit.

Another embodiment of the invention is characterized in that (a) the sampling stage comprises a sampling circuit for producing reference sample signals representative of the texture of a sample of a picture area, which signals are to be transmitted or stored, followed by a circuit for forming a dictionary of equal-size data blocks comprised in the sample signals;

(b) the coding stage comprises a coding circuit for coding the reference sample signals, and a further coding circuit for coding the area signals by vector quantization with the aid of said dictionary-forming circuit;

(c) the decoding stage comprises, arranged in parallel at the output of said transmission and/or storage means, a circuit for decoding the coded reference sample signals and a circuit for decoding the coded area signals by vector quantization;

(d) the picture synthesizing stage comprises a dictionary-forming circuit at the output of the decoding stage to receive the decoded signals therefrom, and uses the output signals of said dictionary-forming circuit to reconstruct a synthetic picture having textures corresponding to those present in the original picture at the input of the device.

In comparison with conventional vector-quantization coders the structure proposed here has the advantage that it is simpler and the cost of coding is substantially reduced owing to the compact form of the dictionary. Indeed, the customary methods of deriving such a dictionary require a substantial computing time (substantially longer than one minute on the customary work stations). In the case of pictures containing various different textures it is therefore not feasible to compute a dictionary for each such texture in a data compression device operating in real time (typically 25 pictures/second). Neither is it feasible to transmit a new dictionary for each new texture since the additional cost of coding will be too high. Customary dictionaries comprise, for example, 1024 words for each for a block of 8×8 pixels, i.e. 65,536 pixels. It follows that in this case a gain in speed could only be achieved for picture areas of a size substantially larger than 65,536 pixels (=a picture area of 256×256 pixels having only a single texture). However, in the case of the invention, a sample of 40×40=1600 pixels is represented by 32×32=1024 words of 8×8 pixels. A gain in speed therefore becomes significant for areas greater than 1600 pixels and so it is advantageous to encode textured picture areas of a size 40 times smaller than previously.

Finally, it is another object of the invention to provide a system for transmitting and/or storing signals corresponding to at least partly textured pictures (i.e., at least some areas having uniform texture).

To this end a system comprising a texture synthesis device of one of the types described above is characterized in that it further comprises:

(1) a circuit for splitting the current picture at the input into two sub-pictures, one of which comprises the textured parts and the other the non-textured parts of said picture;

(2) a circuit for segmentation of said textured sub-picture into areas of homogeneous texture, the output signals of such circuit being applied to said texture synthesis device, which areas may be non-contiguous, (3) a circuit for coding the contours of said areas of homogeneous texture and a circuit for coding the non-textured sub-picture;

(4) after transmission and/or storage, a circuit for decoding the coded contours and a circuit for decoding the coded signals corresponding to the non-textured sub-picture; and (5) a circuit for synthesizing a final picture corresponding to the current picture at the input of said system from output signals of said decoding circuits and said texture synthesis device.

BRIEF DESCRIPTION OF THE DRAWINGS

The invention will now be described in more detail, by way of example, with reference to the accompanying drawings, in which.

DETAILED DESCRIPTION OF PREFERRED EMBODIMENTS OF THE INVENTION

Figure 1:
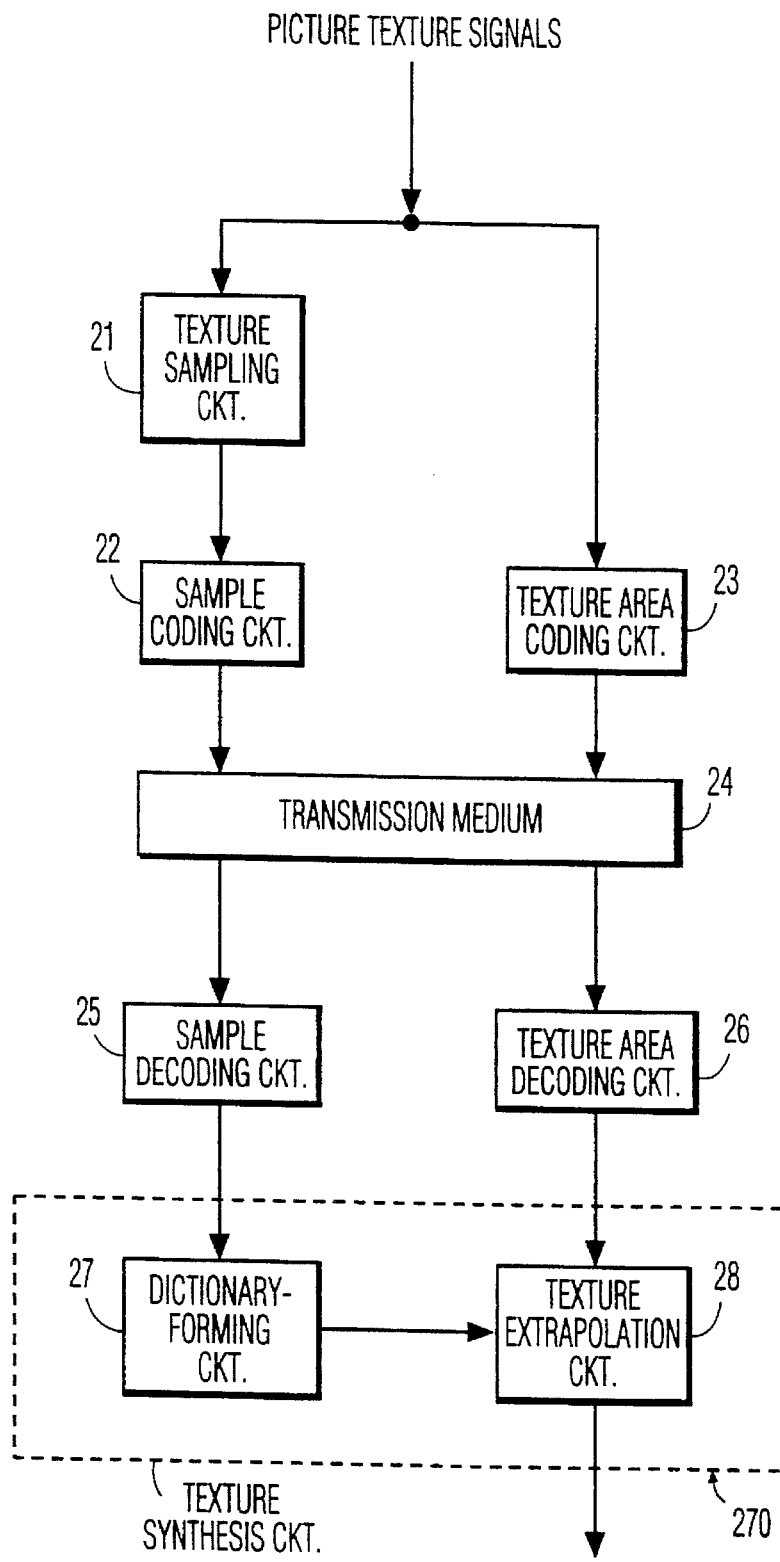
FIGS. 1 and 3 respectively show a first and a second embodiment of a device for transmitting and/or storing texture signals in accordance with the invention.

A first embodiment of the device of the invention is shown in FIG. 1, wherein a sampling circuit 21 takes a sample from an area (of homogeneous texture) of a picture under consideration, the texture information relating to this area being available in the form of digital signals corresponding to the luminosity of the pixels therein. The basic principle of the invention is that owing to the homogenous texture in said area all the information relating to its texture may be regarded as contained in a sample which is representative of this texture, and such sample will subsequently enable the image of the entire area of given texture to be reconstructed simply by using the luminosity patterns of the sample, produced with a certain resolution, and the relative arrangement of these patterns.

A coding circuit 22, at the output of the sampling circuit 21, encodes the signals corresponding to the sample thus taken. Another coding circuit 23, which receives the input signals, encodes such signals for the entire area from which the sample has ben taken. After transmission and/or storage of the coded output signals of the circuits 22 and 23 (with the aid of the transmission medium, which is for example a communication channel or video recorder) a decoding circuit 25 decodes the coded sample signals and a decoding circuit 26 decodes the coded area signals and supply their output signals to a texture synthesis circuit 270. This comprises a dictionary-forming circuit 27, which in the present case derives from the output signals of the sample decoding circuit 5 a dictionary of pixel blocks by taking, for example, all the pixel blocks within the sample and indexing them with corresponding translation information. The translation information gives, for example, the position of the pixel situated at the top and left of each block with respect to that of the pixel situated at the top and left of the entire sample. The dictionary may of course be derived from the blocks within the sample by using geometrical relationships other than translations, the blocks of the sample being indexed with a characteristic parameter or parameters of the selected other geometric relationship.

The texture synthesis circuit 270 also comprises a so-called texture extrapolation circuit 28, which receives the output signals of the dictionary-forming circuit 27 and the decoded area signals from the decoding circuit 26. These decoded area signals enable circuit 28 to produce an approximative synthetic picture therefrom, following which each pixel block therein is replaced by a block from the dictionary in accordance with a predetermined criterion. For example, the "nearest" (in texture) block in the dictionary is looked up in accordance with a distance criterion which minimizes the quadratic distance:

$$Dist = \Sigma_{x,y}(I^{dict}(x,y) - I(x,y))^2$$

in which x, y are the coordinates of the pixels (the same is performed upon all the pixels of the block) and I and $I^{dict}$ indicate the luminosity of a pixel of the approximative synthetic picture and that of the corresponding pixel in the dictionary.

The pixel blocks in the approximative synthetic picture which cover the edge of the sample area are correlated only partly with pixel blocks of the dictionary, the translation information relating to pixels of the sample area which would go beyond the picture edge only being taken into account for calculation of the quadratic distance. When all the block replacements have been effected in the approximate synthetic picture, the result is a definitive synthetic picture formed at the output of the texture synthesis circuit having the original texture of the picture at the input of the device.

The present invention does not only relate to the complete picture synthesis device, but also to the texture synthesis portion thereof. Indeed, based on the signals corresponding, on the one hand, to an approximative texture synthetic picture which is a comparatively rudimentary reproduction of the texture of the entire area under consideration, and on the other hand to a local sample which more accurately represents all the pixel patterns in said texture, the texture synthesis circuit formed by the dictionary-forming circuit 27 and the texture extrapolation circuit 28 effects a reconstruction of a texture image in accordance with the invention in the sense that it enables the reproduction of an entire picture, formed initially by means of comparatively rudimentary information, and extrapolated by means of more accurate locally sampled information.

Moreover, if the original picture comprises different areas having different textures (which areas need not be contiguous) the sampling circuit is adapted to produce respective samples corresponding to the respective areas, the representative samples thus selected then being processed as above in order to perform, after transmission and/or storage, as many texture synthesis operations as there are samples. These texture synthesis operations are effected, for example, either by a single synthesis circuit which is successively activated for each successive batch of decoded signals corresponding to each original sample, or by a plurality of synthesis circuits arranged in parallel and which each receive a respective batch of decoded signals corresponding to a single original sample.

Figure 2:
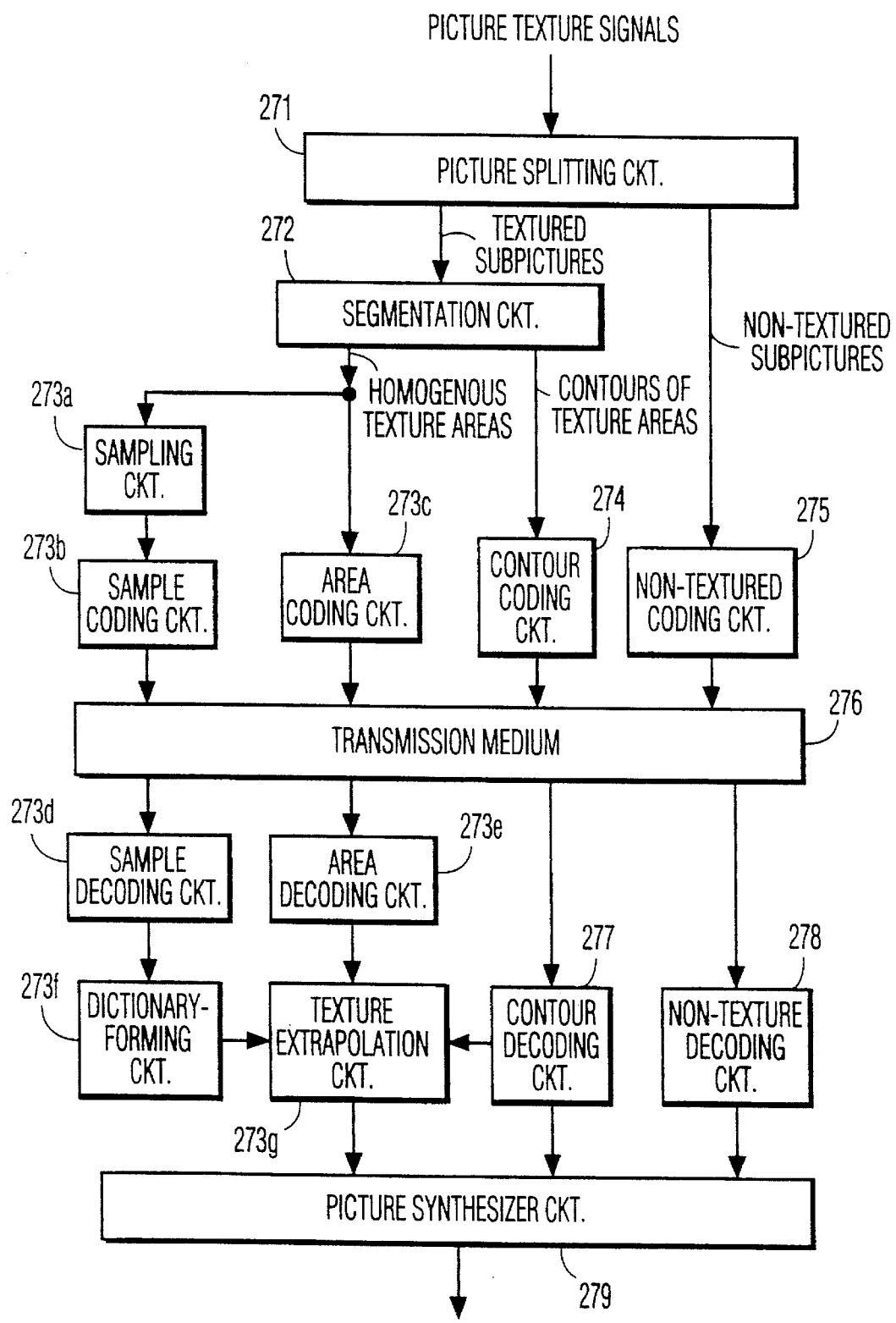
FIGS. 2 and 4 each show an embodiment of a complete transmitting and/or storage system comprising at least a device as shown in FIG. 1 or in FIG. 3 respectively.

FIG. 2 shows an example of a system for transmitting and/or storing signals relating to areas of different textures in a picture which system comprises a texture synthesis device as described above. The system comprises a circuit 271 for splitting a received current picture at the input of the system, as represented by digital signals corresponding to pixel luminosities thereof, into a textured sub-picture and a non-textured sub-picture. The textured sub-picture comprises the textured parts of the received picture, and the non-textured sub-picture comprises the non-textured parts of the received picture. The latter sub-picture can be obtained, for example, by means of a low-pass filter, the textured sub-picture then being derived therefrom by determining the difference from the received picture before splitting. Such filtering and subtracting operations are carried out by the circuit 271.

The textured sub-picture is applied to a segmentation circuit 272 which segments it into areas of homogeneous texture (for example, in accordance with the method described in the paper "Unsupervised segmentation of textured images" by Michel, R. Leonardi and A. Gersho, SPIE vol. 1001, Visual Communication and Image Processing 88, pp. 582–590). This circuit 272 applies the different textures thus formed to a texture synthesis device which is similar to that described hereinbefore with reference to FIG. 1, and which consequently comprises similar elements, i.e. a sampling circuit 273a for taking samples, a circuit 273b for coding the signals corresponding to each of the samples taken, a circuit 273c for coding the signals from the areas from which the samples have been taken, a transmission medium 276 for transmitting and/or storing the coded signals, a circuit 273d for decoding the coded sample signals, a circuit 273e for decoding the decoded area signals, a dictionary-forming circuit 273f and a texture extrapolation circuit 273g.

The segmentation circuit 272 also supplies contour signals representing the contours of the homogeneous texture areas to a contour coding circuit 274. This circuit 274 codes these different contours, for example in accordance with the method described in the thesis by R. Leonardi, Ecole Polytechnique de Lausanne, Switzerland, no. 691, 1987, and the signals thus coded are applied to the transmission medium 276. Finally, a circuit 275 for coding the non-textured sub-picture, received directly from the splitting circuit 271, supplies a third group of coded signals to the transmission medium 274.

After having transmitted and/or stored the various coded signals supplied thereto, the transmission medium 276 supplies such signals to be decoded. The coded texture sample signals are applied to the decoding circuit 273d as described hereinbefore. The coded contour signals are applied to a decoding circuit 277 for decoding the contours which were coded by the circuit 274, and finally the coded signals of the non-textured sub-picture are applied to a decoding circuit 278 for decoding. The decoded contour signals are also applied to the texture extrapolation circuit 273g. The synthesized textures at the output of the circuit 273g, the contours reconstructed by the circuit 277, and the reconstituted sub-picture at the output of the circuit 278, are all applied to a circuit 279 for synthesizing the final picture. It performs operations inverse to those performed by the splitting circuit 271 and the segmentation circuit 272, and supplies the final synthesized picture corresponding to the current picture received at the input of said circuit 271.

Finally, it is to be noted that the dictionary has been described as for pixel blocks of a given size, for example of 8×8 pixels. However, reconstruction of the definitive synthetic picture can be improved by repeating the dictionary formation and the subsequent extrapolation with blocks of a different size, preferably of a size not an integral multiple of the previous size. This modification enables the reproduction of the texture to be improved by elimination of residual block effects.

Figure 3:
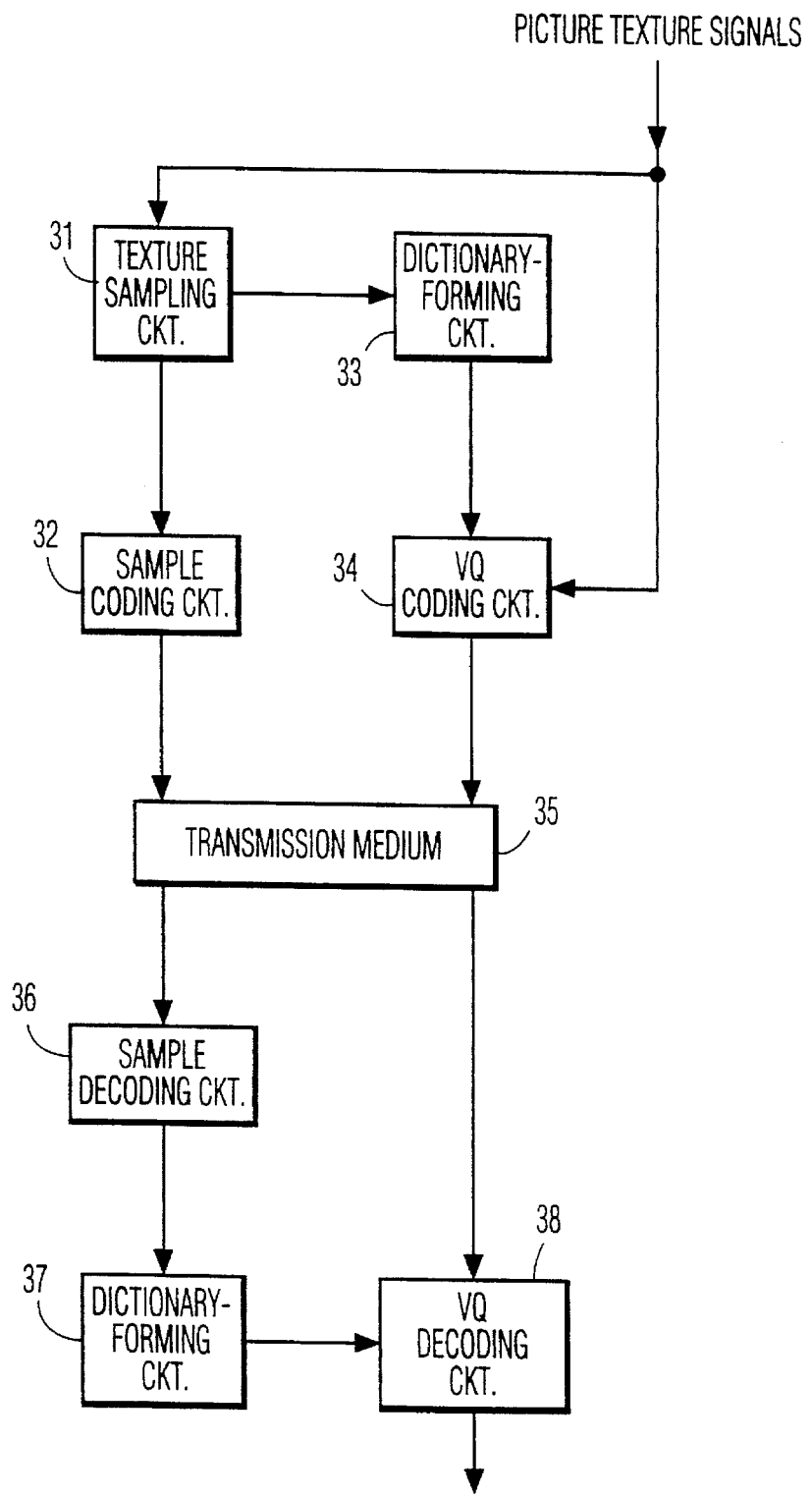

In the second embodiment shown in FIG. 3 the device in accordance with the invention comprises a sampling circuit 31 identical to the sampling circuit 21 in FIG. 1, for taking a sample from an area (of homogeneous texture) under consideration. At the output of the circuit 31 is a circuit 32 for coding signals corresponding to the sample thus obtained, and also a dictionary-forming circuit 33 which in this case derives a dictionary of pixel blocks from the output signals of the circuit 31, for example by taking all the blocks within the sample and indexing them with corresponding translation information. In the same way as above, the translation information gives, for example the position of the pixel situated at the top and left of a block with respect to that of the pixel situated at top and left of the sample. The dictionary may, as before, again be derived from the blocks within the sample by using geometrical relationships other than translations, the blocks of the sample then being indexed with the characteristic parameter or parameters of the selected other relationship.

The device in FIG. 3 also comprises a VQ coding circuit 34 for coding by vector quantization, and which receives the original picture input signals as well as the output signals of the dictionary-forming circuit 33. During this coding process blocks covering the edge of the textured area are correlated only partly with the blocks of the dictionary, only the pixels situated within this area being taken into account.

A decoding circuit 36 decodes the coded sample signals produced by coding circuits 32 and 34 after transmission and/or storage thereof by transmission medium 35. Decoding circuit 36 supplies its output signals to another dictionary-forming circuit 37 which, in the same way as described above for the circuit 33, derives from the output signals of the circuit 36 a dictionary of pixel blocks by taking all the pixel blocks within the sample and indexing then with corresponding translation information (the translation information is supplied in the same way as described above), or with a characteristic parameter or parameters of another selected geometrical relationship. The device finally comprises a VQ decoding circuit 38 for decoding by vector quantization, which receives the output signals of the circuit 37 (blocks of the dictionary) and the coded output signals (block numbers) of the VQ coding circuit 34 after transmission by the transmission medium 35, and produces output signals corresponding to a synthetic picture having the texture of the original picture present at the input of the device.

Figure 4:
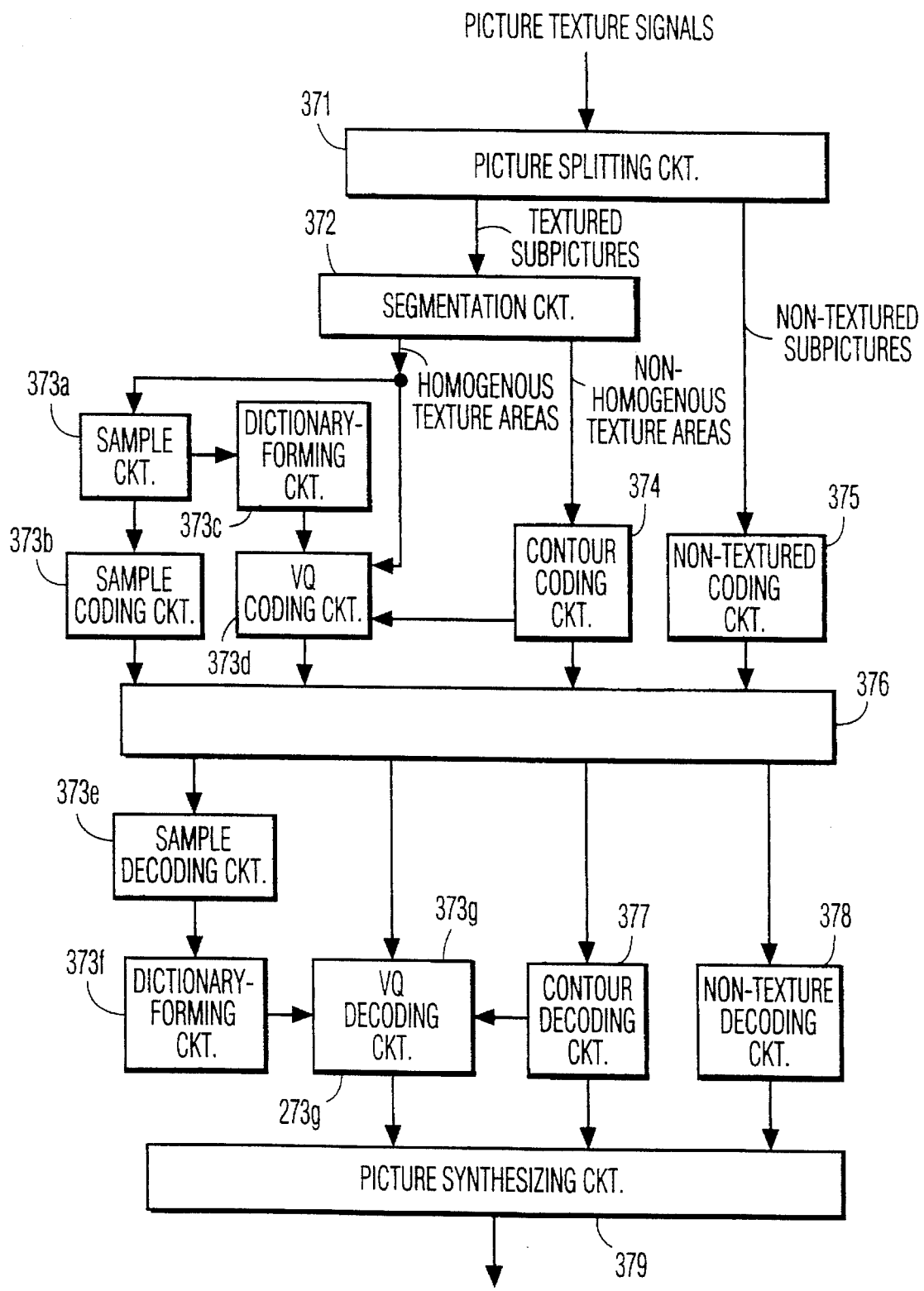

Again, various modifications are possible without departing from the scope of the invention. In particular, if the original picture comprises areas having different textures (these areas need not be contiguous) the sampling circuit may be adapted to provide respective samples corresponding to the respective areas. The representative samples thus selected are then processed as described above in order to provide, after transmission and/or storage, as many texture synthesis operations as there are samples. FIG. 4 shows an embodiment of such a system for transmitting and/or storing texture signals associated with the pictures. In the same way as described above with reference to FIG. 2, this system comprises a circuit 371 for splitting the current picture at the input of the system into two sub-pictures, a textured and a non-textured one, the first of which comprises the textured parts of said picture and the second of which comprises the non-textured parts of this picture. The second sub-picture can be obtained, for example, by means of a low-pass filter, the first sub-picture being derived therefrom by determining the difference from the current picture before splitting. The filtering and subtracting operations are carried out by the circuit 371.

In the same way as above, the textured sub-picture is applied to a segmentation circuit 372 which segments it into areas of homogeneous texture and supplies the different textures thus formed to a texture synthesis device of the type described hereinbefore with reference to FIG. 3, which device consequently comprises similar elements, i.e. a sampling circuit 373a for taking samples, a circuit 373b for coding the signals corresponding to each of the samples taken, a dictionary-forming circuit 373c, a VQ circuit 373d for coding by vector quantization, a transmission medium 376 for transmitting and/or storing the coded signals, a circuit 373e for decoding the coded sample signals, a circuit 373f for formation of the dictionary, and a VQ decoding circuit 373g for decoding by vector quantization.

The segmentation circuit 372 supplies signals corresponding to the contours of homogeneous texture areas to a coding circuit 374 for coding these different contours, and the signals thus coded are applied to the VQ coding circuit 373d and also to the transmission medium 376. Finally, a coding circuit 375 for coding the non-textured sub-picture, which is received directly from the splitting circuit 371, supplies a third group of coded signals to transmission medium 36.

The transmitted and/or stored coded signals from transmission medium 376 include texture signals which are applied to the decoding circuit 373e as described above, the signals resulting from the vector-quantization coding and which are applied to the vector-quantization decoding circuit 373g, the texture contour signals which are applied to a contour decoding circuit 377 for reconstructing the contours coded by the circuit 374, and finally the non-textured sub-picture signals which are applied to a circuit 378 for decoding the non-textured sub-picture coded by the circuit 375. The synthesized textures at the output of the circuit 373g, the contours reconstructed by the circuit 377, and the reconstituted sub-picture at the output of the circuit 378 are all supplied to a circuit 379 for reconstructing the final synthesized picture, which circuit performs operations inverse to those performed by the splitting circuit 371 and the segmentation circuit 372, and supplies a final picture corresponding to the current picture received at the input of said circuit 371.

It is to be noted that, in the same way as above, the dictionary has been described as for pixel blocks of a given size (for example of 8×8 pixels), but the reconstruction of the definitive synthetic picture can be improved if the operations of forming a dictionary and the coding and decoding operations by vector quantization are repeated with blocks of a different size since that will eliminate residual block effects.

We claim:

1. Apparatus for transmitting a video picture which is received at an input of said apparatus in the form of digital signals corresponding to the luminosities of pixels of said video picture, blocks of said signals constituting texture signals representative of textures in said video picture formed by the corresponding blocks of pixels; said apparatus comprising:

a sampling stage coupled to said input for deriving a reference sample of the texture signals relating to an area of the video picture having substantially homogeneous texture, said reference sample including data blocks representative of blocks of pixels in a sample of said area of the video picture;

a first coding stage coupled to said sampling stage for encoding said reference sample of the texture signals relating to said area of the video picture so as to form a coded reference sample signal;

a second coding stage coupled to said input for encoding the texture signals relating to said video picture so as to form coded texture signals;

a transmission medium coupled to said first and second coding stages for transmitting the coded reference sample signal and the coded texture signals, said transmission medium comprising at least one of a communication channel and storage means;

decoding means coupled to said transmission medium for receiving therefrom the transmitted coded reference sample signal and the coded texture signals, and decoding said signals to derive a decoded reference sample signal and decoded texture signals; and picture synthesizing means coupled to said decoding means for (i) combining the decoded texture signals to derive an approximative synthesis of the video picture, and (ii) extrapolating said approximative synthesis of the video picture by replacing pixels in said area of substantially homogeneous texture with pixel blocks represented by the decoded reference sample signal, thereby completing synthesis of the video picture.

2. Apparatus as claimed in claim 1, wherein said decoding means comprises a first decoding stage for decoding the transmitted coded reference sample signal and a second decoding stage for decoding the transmitted coded texture signals, said first and second decoding stages being arranged in parallel; and said picture synthesizing means comprises a dictionary-forming circuit and a texture extrapolation circuit, the dictionary-forming circuit forming a dictionary of data blocks corresponding to blocks of the pixels represented by the decoded reference sample signal, each data block in said dictionary being indexed to indicate the positions of pixels represented thereby in said area of the video picture, the texture extrapolation circuit extrapolating said approximative synthesis by replacing pixels corresponding to decoded texture signals with pixels corresponding to data blocks in said dictionary.

3. Apparatus as claimed in claim 2, wherein the dictionary-forming circuit and the texture extrapolation circuit repeat the operations of forming a dictionary of data blocks of the decoded reference sample signal and replacement of pixels represented by the texture signals with pixels corresponding to data blocks in said dictionary, data blocks of a different size being used in each repetition of said operations.

4. Apparatus as claimed in claim 2, wherein said sampling stage derives respective reference samples of the texture signals from areas of said picture of respectively different homogeneous textures, and said picture synthesizing means synthesizes the textures of the respective areas based on the respective reference samples.

5. Apparatus as claimed in claim 1, wherein:

said second coding stage comprises a first dictionary-forming circuit and a vector quantization (VQ) coding circuit, the first dictionary-forming circuit being coupled to said sampling stage to receive the reference sample of the texture signals corresponding to said area of substantially homogeneous texture of the video picture and produce therefrom a first dictionary of data blocks corresponding to pixels included in said area, each data block being indexed to indicate the positions of the pixels represented thereby in said area, the VQ coding circuit being coupled to said input to receive the texture signals therefrom and to encode them by vector quantization using data blocks from said first dictionary;

said decoding means comprises a first decoding circuit for decoding the transmitted coded reference sample signal and a second decoding circuit for decoding the transmitted coded texture signals by vector quantization, the first and second decoding circuits being arranged in parallel at the output of said transmission medium; and said picture synthesizing means comprises a second dictionary-forming circuit coupled to said first decoding circuit for producing a second dictionary of data blocks of the decoded reference sample signal produced by said first decoding circuit, the data blocks in said second dictionary being indexed the same as the data blocks in said first dictionary and being supplied to said second decoding circuit for use thereby in performing said vector quantization decoding of the transmitted coded texture signals;

the vector quantization decoding of the transmitted coded texture signals resulting in digital signals representing said area of substantially homogeneous texture in said completed synthesis of the video picture.

6. Apparatus as claimed in claim 5, wherein the first and second dictionary-forming circuits repeat the formation of said first and second dictionaries of data blocks, each time using data blocks corresponding to different size blocks of pixels.

7. Apparatus as claimed in claim 5, wherein said sampling stage derives respective reference samples of the texture signals from areas of said picture of respectively different homogeneous textures, and said coding and decoding stages repeat said coding and decoding operations for each of said reference samples.

8. Apparatus as claimed in claim 5, further comprising, coupled between the input of said apparatus and said sampling stage, a picture splitting circuit and a segmentation circuit;

said picture splitting circuit being coupled to said input for receiving the digital signals and separating them into signals representing textured and non-textured areas of said picture, the non-textured signals being supplied to a further coding stage comprised in said apparatus;

said segmentation circuit being coupled to said picture splitting circuit to receive the textured area signals and separate them according to whether they relate to homogeneous or non-homogeneous texture areas of the video picture, the homogeneous texture area signals being supplied to said sampling stage and the non-homogeneous texture area signals being supplied to a contour coding circuit which is also comprised in said apparatus;

the outputs of the first and second coding stages, the contour coding circuit and the further coding stage all being supplied to said transmission medium and after decoding by said decoding means being combined by said picture synthesizing means to form said completed synthesis of the video picture.

9. A system for transmitting a video picture in the form of digital signals which include texture signals and reference sample signals, the texture signals representing textures in the video picture, the reference sample signals representing texture in samples of areas of said picture of respectively different substantially homogeneous textures; the signals being transmitted via a transmission medium, decoded upon reception from said transmission medium, and the decoded signals being supplied to picture synthesizing apparatus for deriving a synthesis of the video picture therefrom; characterized in that said picture synthesizing apparatus comprises:

a dictionary-forming circuit for storing a dictionary of data blocks included in each of the decoded reference sample signals, each data block including data representative of a block of pixels in the sample of the relevant area of the video picture, each data block being indexed to indicate the positions of the pixels represented thereby in said area of the video picture; and a texture extrapolation circuit for (i) combining the decoded texture area signals so as to form an approximative synthesis of the video picture, and (ii) extrapolating said approximative synthesis by replacing pixels represented by decoded texture signals with pixels represented by data blocks in said dictionary; the pixels represented by the data blocks in said dictionary being positioned in the synthesized video picture in accordance with the indexing in said dictionary.

* * * * *